United States Patent
Erickson et al.

(10) Patent No.: US 11,748,813 B2
(45) Date of Patent: Sep. 5, 2023

(54) METHODS AND APPARATUS FOR ASSET MANAGEMENT

(71) Applicant: Copperleaf Technologies Inc., Vancouver (CA)

(72) Inventors: Alejandro Erickson, Burnaby (CA); Anita Mahinpei, North Vancouver (CA); Michael D. Coury, Vancouver (CA); Nicholas Malcolm, Vancouver (CA)

(73) Assignee: Copperleaf Technology Inc., Vancouver (CA)

( * ) Notice: Subject to any disclaimer, the term of this patent is extended or adjusted under 35 U.S.C. 154(b) by 275 days.

(21) Appl. No.: 16/794,935

(22) Filed: Feb. 19, 2020

(65) Prior Publication Data

US 2021/0256610 A1     Aug. 19, 2021

(51) Int. Cl.
*G06Q 40/06*     (2012.01)
*G06F 17/18*     (2006.01)
(Continued)

(52) U.S. Cl.
CPC ........... *G06Q 40/06* (2013.01); *G06F 3/0482* (2013.01); *G06F 17/18* (2013.01); *G06Q 10/06311* (2013.01)

(58) Field of Classification Search
CPC ..................................................... G06Q 40/06
See application file for complete search history.

(56) References Cited

U.S. PATENT DOCUMENTS

| 7,937,280 B1 | 5/2011 | Leung et al. |
| 2007/0124009 A1 | 5/2007 | Bradley et al. |

(Continued)

FOREIGN PATENT DOCUMENTS

| CA | 2594322 A1 | 1/2008 |
| CA | 2616627 A1 | 12/2008 |

(Continued)

OTHER PUBLICATIONS

Meghwani, S., and Thankur, M., in "Multi-objective heuristic algorithms for practical portfolio optimization and rebalancing with transaction cost," in Applied Soft Computing (Year: 2017).*

(Continued)

*Primary Examiner* — Olabode Akintola
*Assistant Examiner* — Brandon M Duck
(74) *Attorney, Agent, or Firm* — MOSER TABOADA (57) ABSTRACT

Methods and apparatus for asset management are provided. The apparatus, for example, a processor to receive an input from a user via an input/output device, the input including information for a plurality of assets maintained by the user; decompose a main problem into multiple sub-problems; independently solve each of the multiple sub-problems to determine corresponding multiple sub-solutions; recombine the corresponding multiple sub-solutions into a solution to the main problem; calculate an intervention schedule for each asset of the plurality of assets based on the solution; and upon receiving a request from the user, output the intervention schedule via one of a display of the input/output device or remote electronic device in communication with the asset management apparatus.

9 Claims, 4 Drawing Sheets

(51) Int. Cl.
    *G06Q 10/06*     (2023.01)
    *G06F 3/0482*   (2013.01)
    *G06Q 10/0631*   (2023.01)

(56) References Cited

U.S. PATENT DOCUMENTS

| | | |
|---|---|---|
| 2008/0133550 A1 | 6/2008 | Bakshi et al. |
| 2015/0066730 A1* | 5/2015 | Midmoore ............ G06Q 40/04 |
| 2016/0132550 A1 | 5/2016 | Coleman et al. |
| 2017/0091688 A1 | 3/2017 | Demoro et al. |
| 2020/0286131 A1* | 9/2020 | Sullivan ............ G06Q 30/0276 |

FOREIGN PATENT DOCUMENTS

| | | |
|---|---|---|
| CN | 104834294 A | 12/2015 |
| EP | 0953929 A2 | 3/1999 |
| JP | 2008216003 A | 9/2008 |
| KR | 20100076708 A | 7/2010 |
| WO | WO-9203905 A2 | 3/1992 |
| WO | WO-9956232 A1 | 11/1999 |
| WO | WO-2015132687 A1 | 9/2015 |
| WO | WO-2015132717 A1 | 9/2015 |

OTHER PUBLICATIONS

International Search Report & Written Opinion, dated May 6, 2021, International Application No. PCT/US2021/013807.
International Preliminary Report on Patentability dated Sep. 1, 2022 for Application No. PCT/US2021/013807, 9 pages.

* cited by examiner

METHODS AND APPARATUS FOR ASSET MANAGEMENT

FIELD

The present disclosure relates, generally, to methods and apparatus used for asset management, and more particularly, to methods and apparatus that use an asset intervention scheduling optimizer for one or more assets maintained by a user.

BACKGROUND

Many businesses face challenges in managing large numbers of pieces of equipment or other assets. For example, some organizations, e.g., a power company, can have an assorted population of electrical generation assets, such as batteries, breakers, switches, turbines, transformers, etc., each of which can be maintained through one or more interventions (e.g., preemptive steps) including upgrades, repairs, refurbishments, and/or replacements of the individual assets. Performing a sequence of these types of interventions on a given asset minimizes a likelihood of failure of an asset and yields a certain amount of value, e.g., producing more electricity, reducing an operating expense, and the like, but also incurs inevitable costs, e.g., capital expense, network down time, staffing, and the like; a constraint is set based on the incurred cost. For example, if a user (e.g., an owner of the organization) wishes to maximize a value of a population of assets, corresponding interventions that would need to be performed over a predetermined time frame (e.g., a 50-year horizon) would be subject to a maximum capital expenditure per year, a minimum number of staff hours per year, and the like. Similarly, a constraint can also be set based on value, e.g., requiring a minimum positive value in a given year.

Accordingly, the inventors have provided methods and apparatus that use an asset intervention scheduling optimizer for one or more assets maintained by a user.

SUMMARY

In accordance with an aspect of the present disclosure, there is provided an asset management apparatus that includes an input/output device; and a processor programmed to: receive an input from a user via the input/output device, the input including information for a plurality of assets maintained by the user; decompose a main problem into multiple sub-problems; independently solve each of the multiple sub-problems to determine corresponding multiple sub-solutions; recombine the corresponding multiple sub-solutions into a solution to the main problem; calculate an intervention schedule for each asset of the plurality of assets based on the solution; and upon receiving a request from the user, output the intervention schedule via one of a display of the input/output device or remote electronic device in communication with the asset management apparatus.

In accordance with an aspect of the present disclosure, there is provided a method for asset management using an asset management apparatus. The method includes receiving an input from a user via an input/output device, the input including information for a plurality of assets maintained by the user; decomposing a main problem into multiple sub-problems; independently solving each of the multiple sub-problems to determine corresponding multiple sub-solutions; recombining the corresponding multiple sub-solutions into a solution to the main problem; calculating an intervention schedule for each asset of the plurality of assets based on the solution; and upon receiving a request from the user, outputting the intervention schedule via one of a display of the input/output device or remote electronic device in communication with the asset management apparatus.

In accordance with an aspect of the present disclosure, there is provided a non-transitory computer readable storage medium having stored thereon a plurality of instructions that when executed by a processor of an asset management apparatus perform a method for asset management. The method includes receiving an input from a user via an input/output device, the input including information for a plurality of assets maintained by the user; decomposing a main problem into multiple sub-problems; independently solving each of the multiple sub-problems to determine corresponding multiple sub-solutions; recombining the corresponding multiple sub-solutions into a solution to the main problem; calculating an intervention schedule for each asset of the plurality of assets based on the solution; and upon receiving a request from the user, outputting the intervention schedule via one of a display of the input/output device or remote electronic device in communication with the asset management apparatus.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Figure 1:
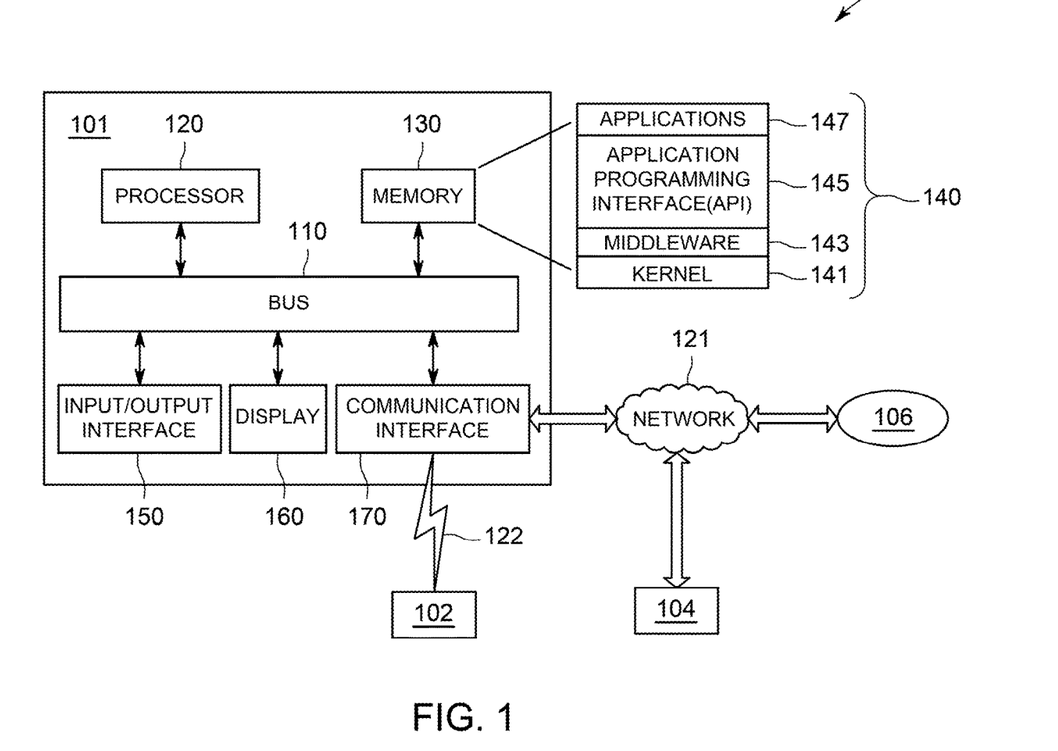
FIG. 1 is a diagram of an asset management apparatus, in accordance with an embodiment of the present disclosure.

Referring to FIG. 1, a diagram of an asset management apparatus embodied in an electronic device 101 (e.g., desktop computer, PC, mobile phone, laptop, server, cloud-based server, or other suitable computing device) that is configured to operate in a network environment 100 is shown. The electronic device 101 includes a bus 110, a processor 120, a memory 130, an input/output device 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, an application processor (AP), and/or a communication processor (CP). The processor 120 controls at least one of the other components of the electronic device 101 and/or processing data or operations related to communication. The processor 120, for example, can use one or more control algorithms (asset management application), which can be stored in the memory 130, to perform a method (e.g., a method 400) for asset management, as will be described in greater detail below.

The memory 130, which can be a non-transitory computer readable storage medium, may include volatile memory and/or non-volatile memory. The memory 130 stores data or commands/instructions related to at least one of other components of the electronic device 101. The memory 130 stores software and/or a program module 140. For example, the program module 140 may include a kernel 141, middleware 143, an application programming interface (API) 145, application programs (or applications) 147, etc. The kernel 141, the middleware 143 or at least part of the API 145 may be called an operating system (OS).

The kernel 141 controls or manages system resources (e.g., the bus 110, the processor 120, the memory 130, etc.) used to execute operations or functions of other programs (e.g., the middleware 143, the API 145, and the applications 147). The kernel 141 provides an interface capable of allowing the middleware 143, the API 145, and the applications 147 to access and control/manage the individual components of the electronic device 101, e.g., when performing an asset bundling routine or operation.

The middleware 143 may be an interface between the API 145 or the applications 147 and the kernel 141 so that the API 145 or the applications 147 can communicate with the kernel 141 and exchange data therewith. The middleware 143 processes one or more task requests received from the applications 147 according to a priority. For example, the middleware 143 assigns a priority for use of system resources of the electronic device 101 (e.g., the bus 110, the processor 120, the memory 130, etc.) to at least one of the applications 147. For example, the middleware 143 processes one or more task requests according to a priority assigned to at least one application program, thereby performing scheduling or load balancing for the task requests. For example, when executing the applications 147, which can include an asset management application (e.g., including an intervention scheduler/optimizer for scheduling interventions for one or more assets), different priorities can be assigned to one or more tasks of the asset management application so that a task having a higher priority can be performed prior to a task having a lower priority, e.g., storing data input by a user can have a relatively high priority, while updating intervention information of an asset in a database of the memory 130 can have a relatively low priority.

The API 145 may be an interface that is configured to allow the applications 147 to control functions provided by the kernel 141 or the middleware 143. The API 145 may include at least one interface or function (e.g., instructions) for file control, window control, image process, text control, or the like.

The input/output device 150 is capable of transferring instructions or data, received from the user or one or more remote (or external) electronic devices 102, 104 or the server 106, to one or more components of the electronic device 101. For example, the input/output device 150 can receive an input, e.g., entered via the display 160, a keyboard, or verbal command, from a user. The input can include information, e.g., intervention information, relating to assets maintained by the user, monetary and resource attributes, intervention type definitions, failure models, as will be described in greater detail below. The input/output device 150 is capable of outputting instructions or data, which can be received from one or more components of the electronic device 101, to the user or remote electronic devices.

The display 160 may include a liquid crystal display (LCD), a flexible display, a transparent display, a light emitting diode (LED) display, an organic LED (OLED) display, micro-electromechanical systems (MEMS) display, an electronic paper display, etc. The display 160 displays various types of content (e.g., texts, images, videos, icons, symbols, etc.). The display 160 may also be implemented with a touch screen. In this case, the display 160 receives touches, gestures, proximity inputs or hovering inputs, via a stylus pen, or a user's body.

The communication interface 170 establishes communication between the electronic device 101 and the remote electronic devices 102, 104 or a server 106 (which can include a group of one or more servers and can be a cloud-based server) connected to a network 121 via wired or wireless communication. The electronic device 101 may employ cloud computing, distributed computing, or client-server computing technology when connected to the server 106.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM), which can be used for global navigation satellite systems (GNSS). The GNSS may include a global positioning system (GPS), global navigation satellite system (Glonass), Beidou GNSS (Beidou), Galileo, the European global satellite-based navigation system, according to GNSS using areas, bandwidths, etc. Wireless communication may also include short-range communication 122. Short-range communication may include at least one of wireless fidelity (Wi-Fi), Bluetooth (BT), near field communication (NFC), and magnetic secure transmission (MST).

Wired communication may include at least one of universal serial bus (USB), high definition multimedia interface (HDMI), recommended standard 232 (RS-232), and plain old telephone service (POTS). The network 121 may include at least one of the following: a telecommunications network, e.g., a computer network (e.g., local area network (LAN) or wide area network (WAN)), the Internet, and a telephone network.

Each of the remote electronic devices 102 and 104 and/or the server 106 may be of a type identical to or different from that of the electronic device 101. All or some of the operations performed in the electronic device 101 may be performed in the remote electronic devices 102, 104 or the server 106. When the electronic device 101 has to perform some functions or services automatically or in response to a request (e.g., when using the asset management application), the electronic device 101 may make a request for performing at least some functions relating thereto to the remote electronic device 102 or 104 or the server 106, instead of performing the functions or services by itself. The remote electronic devices 102, 104 or the server 106 may execute the requested functions or the additional functions and may deliver a result of the execution to the electronic device 101. The electronic device 101 may provide the received result as it is or additionally process the received result and provide the requested functions or services. To achieve this, for example, cloud computing, distributed computing, or client-server computing technology may be used.

An asset management application (e.g., the application 147) includes a plurality of instructions that are executable by the processor 120 using the API 145. The asset management application can be downloaded from the server 106 (or the remote electronic device 104) via the Internet over the network 121 (or from the remote electronic device 102 via, for example, the short-range communication 122) and installed in the memory 130 of the electronic device 101.

When assets fail, e.g., a transformer becomes inoperable, there are consequences, e.g., outages to customers, repair costs to fix the asset, safety risks to employees and/or the public, fire hazard, etc. Consequences of failures of assets can be estimated and monetized based on attributes of the assets (e.g., capacity, redundancy of circuit, etc.). Similarly, a condition of a failure (e.g., a likelihood of failure) for an asset can be evaluated based on, for example, a combination of inspection information and parameters relating to the asset (e.g., installation date, environment in which the asset is subjected to, and the like). A future condition of an asset can be estimated based on an expected degradation of the asset using, for example, statistical analysis (e.g., history of failure of similar assets). Moreover, a current and future probability of a failure mode (e.g., cause of failure) of an asset can be estimated based on a current and expected future condition of the asset, and a risk over time for each failure of the asset can be computed as a product of the probability and consequence of each failure of the asset.

A number of alternative interventions, however, can be performed for an asset (e.g., major/minor maintenance, repair, updating, refurbishment, replacement, etc.) to reduce or eliminate a probability of failure of an asset. Such interventions can be performed multiple times in sequence over a given time frame on a same asset, or in parallel (simultaneously) on a same asset. For example, simultaneous interventions can be performed for a single relatively more complex intervention having multiple operations within itself. For each asset a proposed sequence of interventions has associated therewith monetary or resource costs, benefits, and risks that occur each time that the intervention is performed, which can occur for many years. Attributes of an asset's sequence of interventions is a function of the intervention's effect on a condition and rate of degradation of the asset. For example, as noted above, a risk associated with a failure mode can be calculated using a probability of failure in each year, which can be estimated based on an expected condition of the asset, or through applicable probability distribution functions. Certain benefits may also be estimated from a condition of an asset but can also arise from a result of a specific intervention type, such as technology improvement. Additionally, non-risk costs such as capital expenditure or a limited resource are a direct result of performing an intervention for a given asset.

Moreover, for a plurality or population of assets and sequences of interventions, yearly constraints can be defined on an aggregate of monetary attributes, and certain monetary attributes of a sequence of interventions can be aggregated over time to create an overall valuation of that sequence of interventions.

Valuations on individual assets can be aggregated over a population of assets in order to evaluate an overall solution to a coarse asset intervention optimization (CAISO) problem. For example, a sequence of one or more interventions can be composed for each of the individual assets and a value can be calculated based on performing the one or more interventions over a predetermined time, e.g., 50 years. The calculated value, for example, can be added over the predetermined time, e.g., for each year that the one or more interventions are performed. For example, an optimal feasible solution to the CAISO problem simultaneously satisfies constraints, e.g., capital expenditure constraint, and has a relatively high valuation among all feasible solutions. More particularly, an intervention sequence is a sequence of interventions performed on a single asset within a prioritization time (horizon), i.e., a solution is effectively a collection of intervention sequences (e.g., one for each asset in the CAISO problem), and a feasible solution is one that satisfies all the constraints. Moreover, an optimal (feasible) solution is defined as one with a highest objective function value (e.g., relatively high valuation).

The inventors have found that by dividing the CAISO problem into a plurality of CAISO sub-problems and distributing the CAISO sub-problems among a plurality of worker (computing) nodes, a solution (e.g., a calculated highest value) to the CAISO problem can be determined in a relatively quick time frame. Accordingly, for a given a distributed system with N+1 (computing) nodes, CAISO can be decomposed into N smaller CAISO sub-problems, typically of equal size if the nodes are all equally sufficient or powerful. The N sub-problems can be loaded onto N-worker nodes that perform heuristic search optimization (HSO), while a remaining master node performs distributed HSO (DHSO), e.g., acts as a controller to the N-worker nodes, analyzes aggregate information about the constraints and total valuation, and directs the states (e.g., search phase or trade phase) of the N-worker nodes. For example, in at least some embodiments, the master node can be configured so that the N-worker nodes are simultaneously in the search phase or the trade phase, as will be described in greater detail below. The DHSO and/or the HSO can be configured to handle various types of dependencies between assets, or other features, e.g., constraints, that affect some assets and not others.

In the search phase, the N-worker nodes perform HSO for corresponding N-sub-problems. Each N-worker node sends corresponding aggregate information (e.g., aggregate check-ins) to the master node, and the master node further aggregates the information to create an approximate view of a feasibility and value of the CAISO problem (e.g., to create approximated aggregate information about a whole solution to the main problem).

Once the search phase is completed, the N-worker nodes send a corresponding best-known feasible sub-solution to the master node, if found. For example, if an N-worker node encounters a sequence of feasible sub-solutions during the course of a search phase, it retains the best one of these and discards the others. If, by the end of a search phase, every N-worker node determines a (best) feasible sub-solution in this fashion, these sub-solutions are communicated to the master, which in turn compiles the N feasible sub-solutions into a feasible (whole) solution. Following the search phase and communication of any feasible sub-solutions with the master node, a trade phase may follow if there is to be another search phase, in which the sub-solutions are deconstructed and their component intervention sequences (one sequence for each asset) are shuffled among the N-workers to construct new initial sub-solutions for the next search phase.

Similarly, in the trade phase, which precedes the search phase, the assets (or other information) are reshuffled (e.g., trading an asset) randomly and uniformly among the N-worker nodes. For example, in at least some embodiments, the N-worker nodes trade assets and start a next or new search phase using an intervention sequence found in a previous search phase (which may have been performed by a different N-worker node). For example, the intervention sequence is a state of an asset in a previous sub-solution being reused as a starting state of the same asset in another sub-solution and search phase.

One or more various initial conditions can be used for each asset post-trade search phases. For example, in at least some embodiments, for each asset, post-trade search phases can begin with a sequence of zero (0) interventions and/or a random sequence of interventions. For example, in at least some embodiments, for each asset, post-trade search phases can begin with the same sequence of interventions used in the first (original) search phase.

After one or more search and trade phases have been performed by the N-worker nodes, the master node outputs a best-known feasible solution to the CAISO problem, e.g., in the form of a sequence of interventions (types and dates) for each asset, if a feasible solution was found.

The CAISO sub-problems solved by the N-worker nodes may be large relative to typical scheduling and operations research problems undertaken by other heuristic search methods, so HSO can employ additional (or optional) techniques (e.g., tabu combined with hot spots, diversification, cross-reference data-structure, as described below etc.), which serve, in part, to cope with issues that arise from large (sub-) problems.

For example, during the above described search phase each N-worker node makes selected small changes to a current solution in order to arrive at a new solution, evaluates the new solution, updates the current solution under certain conditions, and continues to iterate in this fashion. A first additional/optional technique that can be used by HSO during a search is a tabu-technique, which is used in order to escape areas of the solution space, typically referred to as basins, around a local maximum that is not globally optimal. The tabu-technique is a heuristic and includes recording a configuration, which may describe any part or whole of a solution, after each move. That configuration becomes tabu, and we may avoid a move that produces the same configuration in the near future in order to escape local maxima. In at least some embodiments, HSO's tabu-technique represent individual sequences of interventions. Alternatively, HSO's tabu-technique represent sets of intervention sequences, or various other configurations, usually related to the move that was made. In order to make the tabu-technique more effective, the HSO focuses on a relatively small stochastically generated hotspot of assets, thus allowing the tabu-technique to guide the selection of local changes more frequently. In accordance with the present disclosure, by concentrating on the hotspot, the tabu configurations are more likely to relate to a move being attempted, e.g., the search is more likely to affect the hotspot-assets several times in close succession; as it does so, the tabu configurations drive the selection of moves more frequently, and the tabu-technique is, therefore, more active in finding desirable intervention sequences, or parts of intervention sequences, for the hotspot-assets. For example, as a current solution approaches boundaries of the feasible solution space, the current solution can become "stuck" in local maxima, which the tabu-technique can help escape from, even by affecting only a few hotspot-assets.

Certain CAISO problems that are tightly constrained may require considerable searching before a feasible solution is found. In such instances, the HSO employs a second additional/optional tabu-technique that diversifies the set of assets that the HSO makes changes to in each step, e.g., shakes-up the solution by deliberately visiting assets whose intervention sequences have not been changed very much.

A third additional/optional technique can be employed when the N-worker nodes begin a search from an infeasible solution, as is often the case. The HSO uses an optional cross-reference data structure (CDS) that allows the HSO to bias a choice of potential changes to make in each step towards those which move the search towards a feasible solution more rapidly and effectively. In at least some embodiments, the CDS can be configured as a tree-like structure. For example, in at least some embodiments, at a top level of the tree-like structure there can be two sub-trees, in which a first sub-tree includes potential interventions (e.g., asset, type, date, and the like) that are not used in the current solution, and a second sub-tree includes potential interventions that are in the current solution.

At a second (or sub) level of the CDS, the sub-trees can represent individual constraints, at a third level of the CDS the sub-trees can represent years, and at a fourth level of the CDS the sub-trees represent assets and intervention sequences, which can be organized into an ordered data structure with fast insertions, deletions, and/or retrievals. The CDS can include more or fewer levels and/or sub-trees as needed.

In at least some embodiments, given a view of residual constraints, which is a distance from a constrained costs/values of a solution to the constraints, after considering aggregate constraint amounts relating to a given solution, the CDS can determine, in each of the main sub-trees, a probability distribution over the asset sub-trees that approximates a number of interventions that should be selected from each constraint-year combination. The probability distribution is a probability mass function (PMF) over the (set of constraints) x (set of prioritization horizon years), which approximates the relative proportions of the number of sub-entities (e.g., can be assets or interventions) referenced under each constraint x year whose selection (for adding or removing an intervention) could lead to a move that would improve the residual constraint, thus allowing a biased sampling (e.g., towards constraint x years that are more violated, because more of the interventions below these nodes need to be chosen to move the solution towards a feasible one). Therefore, the PMF allows a constraint x year to be chosen in a biased way, under which an intervention can be uniformly chosen at random, thus allowing the very violated years to get the most focus. The probability distribution, for example, can be used to sample interventions that affect the constraint-year combinations more-or-less uniformly, with a bias towards affecting the constraint-year combinations where the solution needs to change the most to be satisfied.

Figure 2:
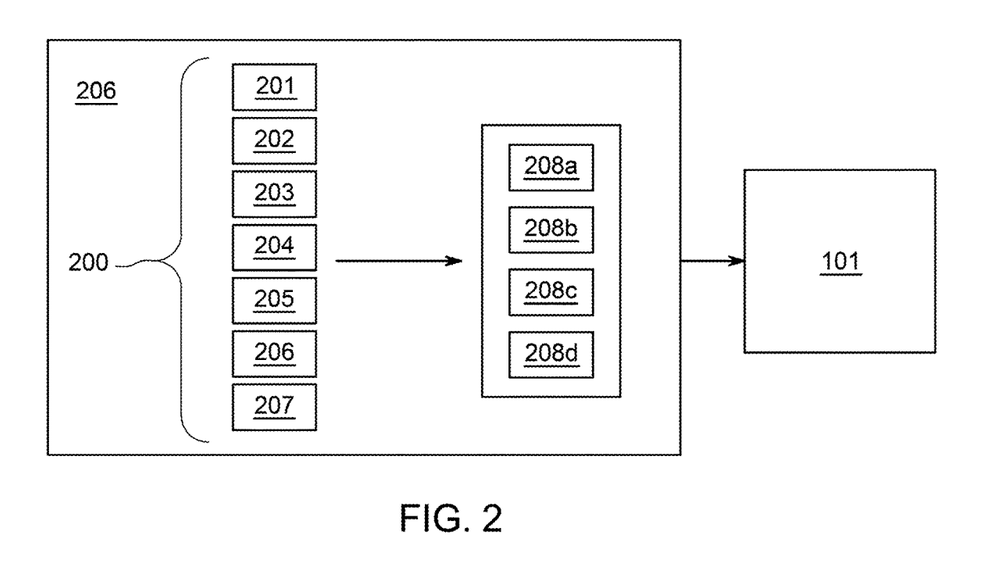
FIG. 2 is a block diagram of a transmission network and an asset management apparatus, in accordance with an embodiment of the present disclosure.
Figure 3A:
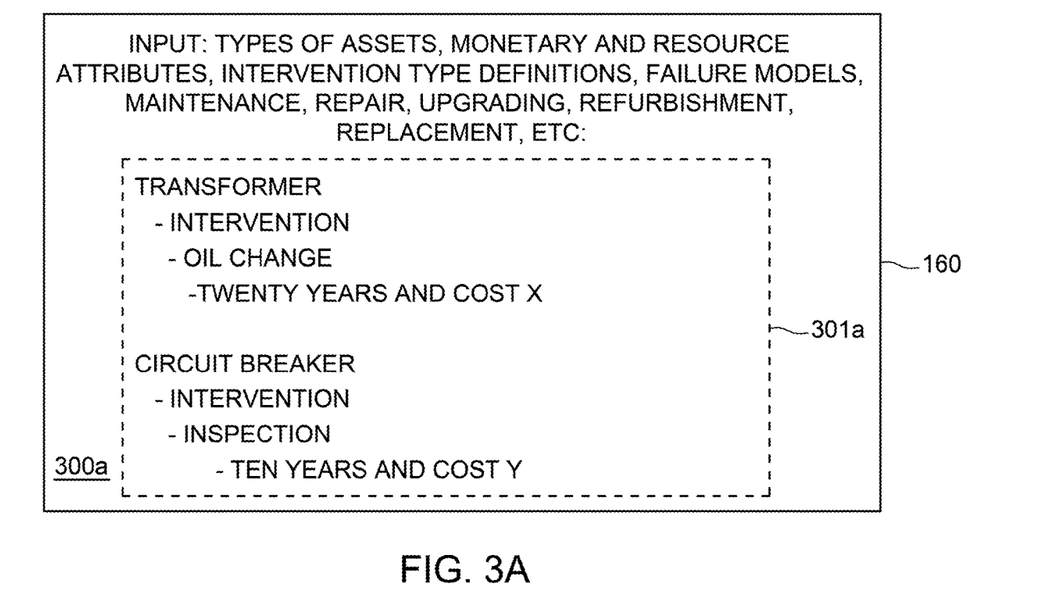
FIGS. 3A and 3B are diagrams of graphical user interfaces (GUIs), in accordance with an embodiment of the present disclosure.
Figure 3B:
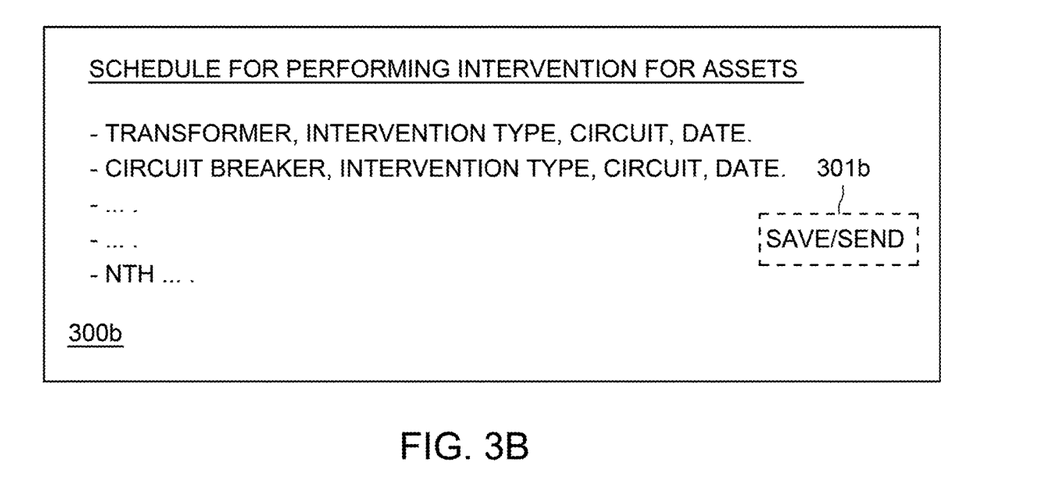

FIG. 2 is a block diagram of a network and an asset management apparatus, and FIGS. 3A and 3B are diagrams of graphical user interfaces (GUIs), in accordance with an embodiment of the present disclosure. For illustrative purposes, it is assumed that the assets which require managing are a plurality of assets 200 (shown schematically) in a network 209 (e.g., power or electrical generation network) maintained by a user. For example, the plurality of assets can include, but are not limited to, a battery 201, a circuit breaker 202, a transformer 203, a switch or relay 204, a turbine 205, an overhead or underground cable 206, transmission tower 207, and the like, each of which can be part of a plurality of circuits 208a-208d in the network 209. While the assets are described herein as being part of a network, the present disclosure is not so limited. For example, the assets need not be part of a network, and can be buildings, human resources, subway cars, and the like.

During an initial set-up of the asset management application on the electronic device 101, the processor 120 can display one or more a GUIs 300a (FIG. 3A) on the display 160 requesting that a user input information relating to the assets to be managed by the asset management application, so that the processor 120 can determine an intervention strategy or schedule for a relatively large number of assets in a corresponding circuit (segment) or across two or more circuits (e.g., two or more independent circuits) in a network. The information can include, but is not limited to, one or more types of assets, budget constraints, monetary and resource attributes, intervention type definition (e.g., maintenance, repair, upgrading, refurbishment, replacement, etc.), time frame for performing an intervention, failure models, and the like.

For illustrative purposes, the GUI 300a is shown including information for the assets including the transformers 203 in the circuits 208a, 208b and the circuit breakers 202 in circuits 208a, 208b. Additionally, with respect to the transformers 203, the user can input information relating to a type of intervention for the transformers 203 (e.g., oil change), such as the costs and benefits of performing the intervention, the amount of time that it requires, and the details of any service outage (in relation to the assets affected) it requires. With respect to the circuit breakers 202, the user can input information relating to a type of intervention for the circuit breakers 202 (e.g., inspection), such as the costs and benefits of performing the intervention, the amount of time that it requires, and the details of any service outage (in relation to the assets affected) it requires.

After the information relating to the assets are input, the processor 120 can display a selectable area 301a on the display 160 so that the user can review/edit the information in the selectable area 301a, and can upload and store the information in the memory 130 during the initial set-up. The information relating to the asset can also be uploaded and stored in a memory of the server 106, i.e., when the electronic device 101 uses an asset management application that is being executed at the server 106.

Figure 4:
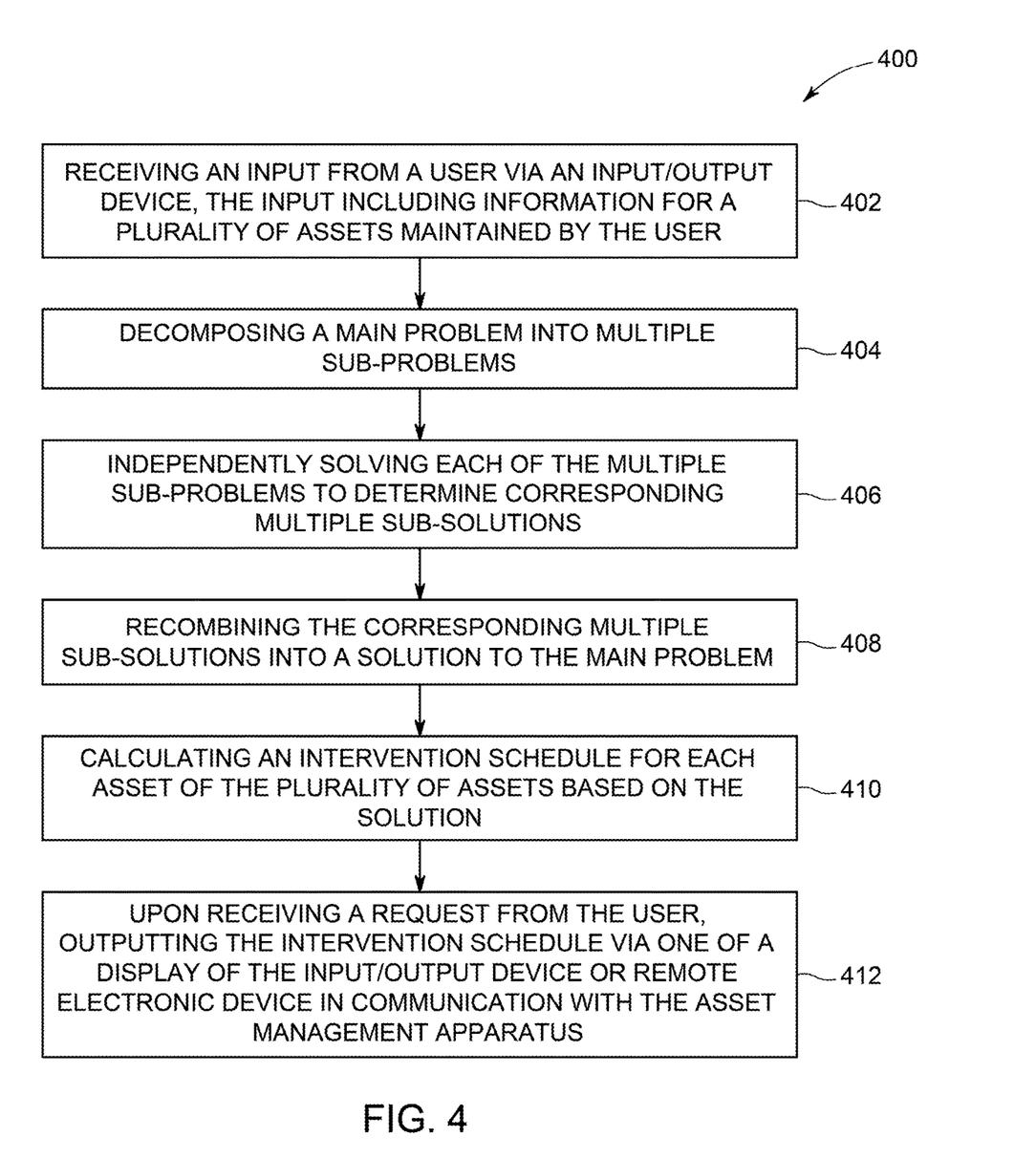
FIG. 4 is a flowchart of a method for asset management, in accordance an embodiment of the present disclosure.
Figure 5:
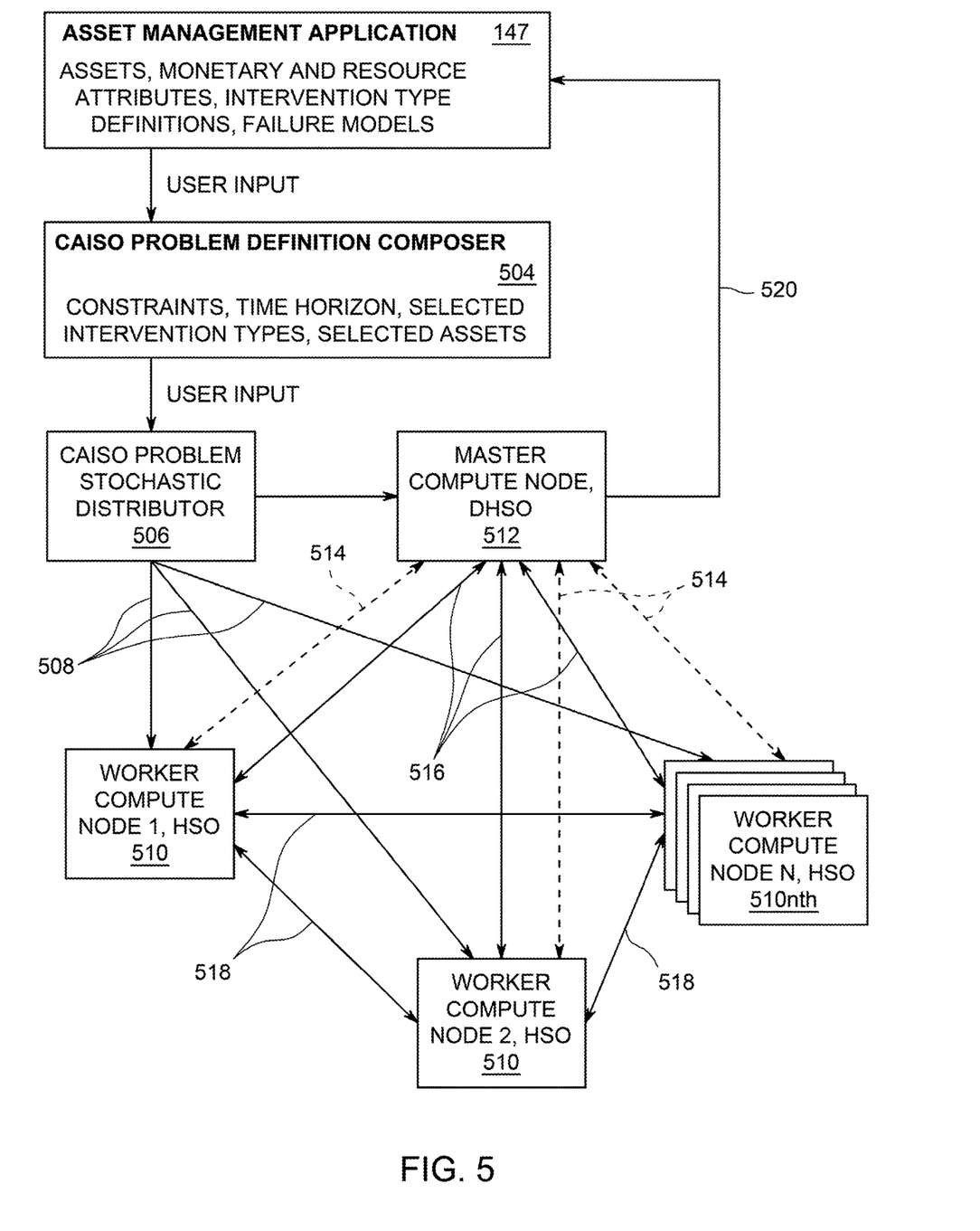
FIG. 5 is a diagram of components of the asset management application configured for performing the method of FIG. 4, in accordance an embodiment of the present disclosure.

FIG. 4 is a flowchart of a method 400 for asset management and FIG. 5 is a diagram of components of the asset management application configured for performing the method of FIG. 4, in accordance with an embodiment of the present disclosure.

The processor 120, using the display 160, can prompt a user to select one or more assets, intervention types, time frames or horizons for which the interventions are to be performed (e.g., months, years, and the like), budget constraints, etc., see 402 of FIG. 4, for example. The processor 120 using a CAISO problem definition composer 504 composes a CAISO problem (e.g., a main problem) based on a selection of one or more assets, corresponding intervention types, time frames, budget constraints, and the like. The CAISO problem can be directed toward one asset or a plurality of assets. For illustrative purposes, the method 400 is described in terms of a CAISO problem for the transformer 203 and a circuit breaker 202.

The budget constraints, for example, can include an annual budget, e.g., ten billion dollars, that is allocated by a company for maintaining all assets in the network 209. The processor 120 can determine an aggregate of one or more monetary attributes to determine an overall valuation of a sequence of interventions over a time frame (e.g., ten years, twenty years, fifty years, and the like), staying within the annual budget constraint over that time frame. For illustrative purposes, the annual budget constraint is assumed fixed, but the present disclosure is not so limited, as a value for the annual budget can be varied over the time frame. The one or more monetary attributes can include, but are not limited to, an amount of value of an intervention for an asset (e.g., asset production (electricity, power, etc.), reduction of operating expense of asset, and the like) and a cost of performing the intervention for an asset (e.g., capital expense, network down time, staffing, and the like). If more than one, an aggregate of the monetary attributes can be determined simultaneously. The processor 120 aggregates valuations for each of the individual assets over the population of assets in order to evaluate an overall best-known feasible solution to the CAISO problem.

More particularly, at 404, the processor 120 decomposes the composed CAISO problem (e.g., for the transformer and circuit breaker) into multiple CAISO sub-problems (e.g., N multiple sub-problems, which are disjoint, in that they have no assets in common). Specifically, if there are ten assets and cost constraints of eight and twelve in fiscal years 2025, 2026, then the problem can be decomposed into two equal parts with five assets and cost constraints of four and six in fiscal years 2025 and 2026; other parameters such as intervention types, prioritization horizon, etc. remain the same. For example, in at least some embodiments, the processor 120 uses a stochastic problem distributor 506 to stochastically decompose (e.g., randomly determined having a random probability distribution or pattern that may be analyzed statistically but may not be predicted precisely) the CAISO problem into multiple CAISO sub-problems 508, which are loaded onto one or more N-worker nodes 510. More particularly, the stochastic problem distributor 506 partitions the assets of the main CAISO problem, such that the distribution of assets among the parts of the partition satisfy some useful statistical properties but may not be predicted precisely. Usually the most useful statistical property is that each part contains similar proportions of assets of each type, as you typically find by generating a partition uniformly at random (among all possible partitions with appropriately sized parts). Additionally, the stochastic problem distributor 506 creates a master node 512 that acts as a controller to the N-worker nodes 510, analyzes aggregate information about the constraints and total valuation, and directs the states (e.g., search phase or trade phase) of the N-worker nodes, as described above. In at least some embodiments, the N-worker nodes 510 and the master node 512 can be configured identically to each other (e.g., have equal power capability as each other). As used herein, power capability is the ability to solve problems, which can be relatively large (e.g., complex) or relatively small (e.g., simple). In at least some embodiments, a power capability can be measured using a benchmarking program that does a brief calculation (e.g., can take a few seconds or minutes) on each N-worker node and reports statistics about each N-worker node's performance. Additionally, each N-worker node may report other information about itself, such as its processor speed, amount of memory, etc. A metric can be extracted from the reported information, and thus each N-worker node receives a proportion of assets according to its relative performance, as determined by the metric. Note that the proportion of assets in the CAISO sub-problem reflects the proportion of constraint amount given to the CAISO sub-problem. Alternatively, a power capability for each of the master node 512 and/or the N-worker nodes can be different. For example, in at least some embodiments, a power capability of the master node 512 can be relatively high when compared to a power capability of each of the N-worker nodes 510. Additionally, a power capability of each of the N-worker nodes can be different from each other. For example, some of the N-worker nodes 510 can have a power capability that is relatively high (e.g., for solving sub-problems that are relatively large) and some of the N-worker nodes can have a power capability that is relatively low (e.g., for solving sub-problems that are relatively small).

Next, at 406, each of the N-worker nodes 510 applies an HSO independently to each of the sub-problems to determine corresponding sub-solutions. More particularly, the master node 512 controls the N-worker nodes to operate in the search phase and/or trade phase. For example, in at least some embodiments, in the search phase, the N-worker nodes 510 perform HSO for a corresponding loaded N-sub-problems, which includes using at least one of the assets and a portion of each of the constraints. For example, as described above, assets and constraint amount (e.g., in each year) are partitioned, and all other parameters remain the same. For example, during the search phase, some of the N-worker nodes 510 (e.g., Node 1) can be configured to solve corresponding sub-problems for the transformer, while some of the N-worker nodes 510 (e.g., Node 2) can be configured to solve corresponding sub-problems for the circuit breaker (e.g., 2-asset problem, N=2 so that each worker-node must get one (1) asset and ½ the constraint amount). For example, during the search phase, each of the N-worker nodes 510 performs HSO on its corresponding sub-problem, and if the 2-worker nodes find a feasible solution, the 2-worker nodes send the intervention sequences found, respectively, into one 2-asset solution, recomposed on the master node 512. As can be appreciated, any efforts to maintain statistical properties of the distribution are thwarted by the small size of the example. Additionally, during the search phase, in at least some embodiments, each N-worker node periodically sends corresponding aggregate information 514 (e.g., aggregate check-ins, shown in phantom) to the master node 512, and the master node 512 aggregates the received information to create an approximate view of a feasibility and value of the CAISO problem. The master node 512 can use the knowledge gained from the check-ins to determine when to call a halt to the search phase and possibly compose a feasible solution, as detailed below. Alternatively, the periodic check-ins can be omitted, and either the master node 512 can wait a pre-determined period of time and send a stop-search request to the N-worker nodes 510, or each N-worker node can apply its own stopping criteria, e.g., relating to the convergence of objective function valuations of solutions obtained at consecutive iterations. After stopping the search phase, the N-workers nodes can report their best-known feasible solutions if they have them.

In at least some embodiments, during a search phase, the N-worker nodes 510 may use one or more of the additional (or optional) techniques, e.g., tabu combined with hotspots, diversification, cross-references, as described above.

Once a search phase is completed, and if the N-worker nodes 510 have determined a best-known feasible sub-solution, the N-worker nodes 510 send a corresponding best-known feasible sub-solution 516 to the master node 512, which, in turn, compiles the N best-known feasible sub-solutions into a single feasible solution (whole solution), e.g., the best of the N feasible sub-solutions is retained, and the remaining sub-solutions are discarded, as will be described in greater detail below. For example, in at least some embodiments, the master node 512 stops searching when there is relatively little change, iteration to iteration, in the DHSO objective function (as compared to the amount of change in the first few hundred iterations of the search phase). Alternatively, a wall-clock time-limit, a fixed number of iterations, or simply an absolute convergence in objective function change can be used.

In at least some embodiments, the N-worker nodes can be configured to determine their own convergence criteria and stop searching on their own, e.g., where the N-worker nodes report the satisfaction of their own convergence-criteria to the master node. Once all workers have stopped searching, the master node halts the trade phase.

As noted above, the N-worker nodes 510 are configured to trade assets and start a next or new search phase using an intervention sequence found in a previous search phase (which may have been performed by a different N-worker node). The trade phase causes assets and their corresponding intervention sequences to be moved from one N-worker node to another N-worker node. The partition of the main CAISO problem is, therefore, effectively shuffled into a new partition, in which each sub-problem has a number of assets whose current (initial) solution comprises the intervention sequences found in the previous search phase. As noted above, however, other initial conditions for a current solution, e.g., a sequence of zero (0) interventions and/or a random sequence of interventions, can be used for post-trade search phases. The master node 512 can halt or stop a search phase, e.g., the N-worker nodes 510 stop computing the sub-solutions for the sub-problems decomposed from the CAISO problem. Subsequently, the N-worker nodes 510 are configured to trade assets 518 along with their corresponding intervention sequences to the one or more other N-worker nodes 510 (e.g., new sub-problems are created as a consequence of the asset trade). For example, in the 2-asset CAISO problem on 2 N-worker nodes 510, described above, there is a circuit breaker asset assigned to one N-worker node, here called worker A, and a transformer assigned to the other N-worker node, worker B, during a given search phase. By the end of that search phase, each N-worker node has determined an intervention sequence for its asset, and the N-worker nodes (may) trade their assets and their corresponding intervention sequences. In this simplified example, one such trade results in worker A receiving the transformer and its intervention sequence (i.e., the one determined by worker B in the previous search phase), and worker B receiving the circuit breaker and its intervention sequence.

After each of the search and trade phases have been performed by the N-worker nodes 510, at 408, the master node 512 recombines the received best-known feasible sub-solutions (if found) sent by the N-worker nodes 510 into a best-known feasible solution to the CAISO problem. More particularly, after each search phase, the best-known feasible sub-solution of that search phase (if found) is reported to the master node 512. If there is such a sub-solution being provided from every N-worker node 510, the master node 512 can recombine all of the best-known feasible sub-solutions into an overall feasible solution. If that solution is a best overall feasible solution (e.g., comparing to others recomposed at the ends of search phases), that best overall feasible solution is kept, and the previous best-known overall feasible solution is discarded. For example, the master node 512 analyzes all the best-known feasible sub-solutions to the sub-problems gathered during 406, computes a total valuation for each of the best-known feasible sub-solutions, and determines/calculates the best-known feasible solution 520 to the CAISO problem, which can be stored in the asset management application and accessed by the processor 120 for future use. The valuation of a solution is a sum of the valuations of the intervention sequences in the solution (e.g., one for each asset). The valuation of an intervention sequence is the net value of the combined monetary attributes of the interventions of the asset, including costs, technology benefits, etc., and a best solution is the one with the highest valuation.

Next, at 410, based on the best-known feasible solution to the CAISO problem, the master node 512 creates an intervention schedule (see GUI 300b of FIG. 3B, for example) for each asset of the plurality of assets, e.g., in the form of a sequence of interventions (types and dates) for each asset. The intervention schedule can also be stored in the asset management application and accessed by the processor 120 for future use.

For example, at 412, upon receiving a request from the user, the processor 120 can output the intervention schedule via one of a display (e.g., display 160) of the input/output device or remote electronic device in communication with the asset management apparatus. For example, the processor 120 can output the GUI 300b that includes a list of the assets, the type of intervention, a circuit in which the asset is located, dates at which the intervention is to be performed, etc. In at least some embodiments, a selectable area 301b can be displayed in the GUI 300b. For example, the selectable area 301b can be used to save the information in the GUI 300b in the memory 130 and/or can be used to send the information in the GUI 300b to the one or more remote (or external) electronic devices 102, 104 or the server 106.

Using the methods and apparatus described herein, allows a user (or organization) to determine intervention strategies in a relatively quick and cost-effective manner. Additionally, the methods and apparatus described herein allow a user to maximize capital expenditures, staff workers, and the like while maintaining assets.

While the herein described methods and apparatus use the asset management application for determining intervention strategies for assets in a circuit of a transmission network, the disclosure is not so limited. For example, the asset management application installed on the electronic device 101 (or the remote electronic devices 102, 104 and/or server 106) can be used for determining intervention strategies for other types of assets that are part of the same network, e.g., pipes, gas pipelines, traffic lights, other utility assets, railroad tracks, network, cable, or any other generalized asset. For example, the asset management application can be used for assets/components that are part of segments in one or more infrastructures, of which one segment in the infrastructure must be disabled in order to do an intervention on an asset (or component) in the disabled segment and/or other segment in the infrastructure. For example, the asset management application can be configured to perform interventions for assets/components in segments of a plurality of segments in a gas pipeline network. For example, the asset management application can calculate an intervention schedule for assets/components that are located in two or more segments of a plurality of segments in the gas pipeline network. Likewise, the asset management application can be used for multiple different networks, e.g., combined infrastructure, including respective assets. For example, the asset management application can be used for combined assets in circuits in a transmission network and for assets/components in segments of a gas pipeline network.

While the foregoing is directed to embodiments of the present disclosure, other and further embodiments of the disclosure may be devised without departing from the basic scope thereof.

The invention claimed is:

1. An asset management apparatus comprising:
an input/output device; and
a processor connected via a circuit to the input/output device and a program module that stores data and transmits the data to the processor for programming the processor to:
receive, via a definition composer, an input from a user via the input/output device, the input including information for a plurality of assets maintained by the user;
stochastically decompose, via a stochastic distributor, a main problem into multiple sub-problems, the stochastic distributor creates a master node, which is a computing device that controls N-worker nodes, which are computing devices configured to solve each of the multiple sub-problems, analyzes aggregate information about constraints and total valuation, and directs states, which comprise a search phase and a trade phase, of the N-worker nodes, wherein the master node performs distributed heuristic search optimization for directing the states and during the search phase each of the N-worker nodes performs heuristic search optimization for solving a corresponding one of the multiple sub-problems, and wherein the trade phase comprises trading an asset and corresponding intervention sequence assigned to one of the N-worker nodes with an asset and corresponding intervention sequence assigned to a different one of the N-worker nodes;
receive, from the N-worker nodes, information comprising at least one of a power capability of the N-worker nodes, a processor speed of the N-worker nodes, or an amount of memory of the N-worker nodes;
calculate a metric for the N-worker nodes based on at least one of the power capability of the N-worker nodes, the processor speed of the N-worker nodes, or the amount of memory of the N-worker nodes;
assign an asset of the plurality of assets and a sub-problem of the multiple sub-problems to the N-worker nodes based on the calculated metric such that the N-worker nodes with a high metric solve sub-problems that are relatively large and the N-worker nodes with a low metric solve sub-problems that are relatively small;
independently solve, via the N-worker nodes, each of the multiple sub-problems to determine corresponding multiple sub-solutions;
recombine, via the master node, the corresponding multiple sub-solutions into a solution to the main problem;
calculate, via the master node, an intervention schedule for each asset of the plurality of assets based on the solution; and
upon receiving a request from the user, output the intervention schedule via one of a display of the input/output device or remote electronic device in communication with the asset management apparatus.

2. The asset management apparatus of claim 1, wherein the processor is further configured to compose the main problem based on a selection of at least one of the plurality of assets, corresponding intervention types, time frames, or monetary attributes.

3. The asset management apparatus of claim 1, wherein the processor is further configured to receive aggregate information from the N-worker nodes during a search phase to create approximated aggregate information about a whole solution to the main problem.

4. A method for asset management using an asset management apparatus comprising:
- via a definition composer, receiving an input from a user via an input/output device, the input including information for a plurality of assets maintained by the user;
- via a stochastic distributor, stochastically decomposing a main problem into multiple sub-problems;
- via the stochastic distributor, creating a master node, which is a computing device that controls N-worker nodes, which are computing devices configured to solve each of the multiple sub-problems, analyzing aggregate information about constraints and total valuation, and directing states, which comprise a search phase and a trade phase, of the N-worker nodes, wherein the master node performs distributed heuristic search optimization for directing the states and during the search phase each of the N-worker nodes performs heuristic search optimization for solving a corresponding one of the multiple sub-problems, and wherein the trade phase comprises trading an asset and corresponding intervention sequence assigned to one of the N-worker nodes with an asset and corresponding intervention sequence assigned to a different one of the N-worker nodes;
- that controls N-worker nodes, configured to solve each of the multiple sub-problems, analyzes aggregate information about constraints and total valuation, and directs states of the N-worker nodes;
- via the stochastic distributor, receiving, from the N-worker nodes, information comprising at least one of a power capability of the N-worker nodes, a processor speed of the N-worker nodes, or an amount of memory of the N-worker nodes;
- via the stochastic distributor, calculating a metric for the N-worker nodes based on at least one of the power capability of the N-worker nodes, the processor speed of the N-worker nodes, or the amount of memory of the N-worker nodes;
- via the stochastic distributor, assigning an asset of the plurality of assets and a sub-problem of the multiple sub-problems to the N-worker nodes based on the calculated metric such that the N-worker nodes with a high metric solve sub-problems that are relatively large and the N-worker nodes with a low metric solve sub-problems that are relatively small;
- via the N-worker nodes, independently solving each of the multiple sub-problems to determine corresponding multiple sub-solutions;
- via the master node, recombining the corresponding multiple sub-solutions into a solution to the main problem;
- via the master node, calculating an intervention schedule for each asset of the plurality of assets based on the solution; and
- upon receiving a request from the user, outputting the intervention schedule via one of a display of the input/output device or remote electronic device in communication with the asset management apparatus.

5. The method of claim 4, further comprising composing the main problem based on a selection of at least one of the plurality of assets, corresponding intervention types, time frames, or monetary attributes.

6. The method of claim 4, further comprising receiving aggregate information from the N-worker nodes during a search phase to create approximated aggregate information about a whole solution to the main problem.

7. A non-transitory computer readable storage medium having stored thereon instructions that when executed by a processor of an asset management apparatus cause the processor to perform a method for asset management comprising:
- via a definition composer, receiving an input from a user via an input/output device, the input including information for a plurality of assets maintained by the user;
- via a stochastic distributor, stochastically decomposing a main problem into multiple sub-problems;
- via the stochastic distributor, creating a master node, which is a computing device that controls N-worker nodes, which are computing devices configured to solve each of the multiple sub-problems, analyzing aggregate information about constraints and total valuation, and directing states, which comprise a search phase and a trade phase, of the N-worker nodes, wherein the master node performs distributed heuristic search optimization for directing the states and during the search phase each of the N-worker nodes performs heuristic search optimization for solving a corresponding one of the multiple sub-problems, and wherein the trade phase comprises trading an asset and corresponding intervention sequence assigned to one of the N-worker nodes with an asset and corresponding intervention sequence assigned to a different one of the N-worker nodes;
- via the stochastic distributor, receiving, from the N-worker nodes, information comprising at least one of a power capability of the N-worker nodes, a processor speed of the N-worker nodes, or an amount of memory of the N-worker nodes;
- via the stochastic distributor, calculating a metric for the N-worker nodes based on at least one of the power capability of the N-worker nodes, the processor speed of the N-worker nodes, or the amount of memory of the N-worker nodes;
- via the stochastic distributor, assigning an asset of the plurality of assets and a sub-problem of the multiple sub-problems to the N-worker nodes based on the calculated metric such that the N-worker nodes with a high metric solve sub-problems that are relatively large and the N-worker nodes with a low metric solve sub-problems that are relatively small;
- via the N-worker nodes, independently solving each of the multiple sub-problems to determine corresponding multiple sub-solutions;
- via the master node, recombining the corresponding multiple sub-solutions into a solution to the main problem;
- via the master node, calculating an intervention schedule for each asset of the plurality of assets based on the solution; and
- upon receiving a request from the user, outputting the intervention schedule via one of a display of the input/output device or remote electronic device in communication with the asset management apparatus.

8. The non-transitory computer readable storage medium of claim 7, further comprising composing the main problem based on a selection of at least one of the plurality of assets, corresponding intervention types, time frames, or monetary attributes.

9. The non-transitory computer readable storage medium of claim 7, further comprising receiving aggregate information from the N-worker nodes during a search phase to create approximated aggregate information about a whole solution to the main problem.

* * * * *